(12) United States Patent
Abundis Vargas

(10) Patent No.: US 10,894,547 B2
(45) Date of Patent: Jan. 19, 2021

(54) METHOD, APPARATUS, AND SYSTEM FOR ASSESSING SAFETY AND COMFORT SYSTEMS OF A VEHICLE

(71) Applicant: HERE GLOBAL B.V., Eindhoven (NL)

(72) Inventor: Lidia Alejandra Abundis Vargas, Leon (MX)

(73) Assignee: HERE Global B.V., Eindhoven (NL)

( * ) Notice: Subject to any disclaimer, the term of this patent is extended or adjusted under 35 U.S.C. 154(b) by 243 days.

(21) Appl. No.: 16/193,921

(22) Filed: Nov. 16, 2018

(65) Prior Publication Data

US 2020/0156652 A1 May 21, 2020

(51) Int. Cl.
| | | |
|---|---|---|
| *B60W 50/04* | (2006.01) | |
| *G07C 5/08* | (2006.01) | |
| *B60W 50/00* | (2006.01) | |
| *G06Q 10/02* | (2012.01) | |
| *G06Q 50/30* | (2012.01) | |
| *G07C 5/00* | (2006.01) | |

(52) U.S. Cl.
CPC ...... *B60W 50/045* (2013.01); *B60W 50/0098* (2013.01); *G06Q 10/02* (2013.01); *G06Q 50/30* (2013.01); *G07C 5/008* (2013.01); *G07C 5/0808* (2013.01)

(58) Field of Classification Search
CPC ........... B60W 50/045; B60W 50/0098; B60W 2556/10; B60W 2556/45; B60W 50/14; B60W 50/0205; G07C 5/0808; G07C 5/008; G06Q 10/02; G06Q 50/30
See application file for complete search history.

(56) References Cited

U.S. PATENT DOCUMENTS 8,694,328 B1* 4/2014 Gormley ............. B60R 16/0373
705/1.1
9,852,599 B1* 12/2017 Slavin .................... G16H 80/00
9,884,630 B1* 2/2018 Ross ................. B60W 50/0098
(Continued)

FOREIGN PATENT DOCUMENTS

EP 3239686 A1 11/2017
WO 2017147007 A1 8/2017

*Primary Examiner* — Behrang Badii
*Assistant Examiner* — Jalal C Coduroglu
(74) *Attorney, Agent, or Firm* — Ditthavong & Steiner, P.C.

(57) ABSTRACT

An approach is provided for assessing safety conditions of a vehicle. The approach, for example, involves aggregating operational data associated with a vehicle from a plurality of data sources. The approach also involves processing the operational data against operational criteria to determine a normal operational status or an abnormal operational status of the vehicle. The approach further involves generating an independent assessment of a safety condition of the vehicle based on the normal operational status or the abnormal operational status. The independent assessment is performed independently of an assessment system of the vehicle, a manufacturer of the vehicle, or a combination thereof. The approach further involves in response to a request by a user to use the vehicle, providing data indicating the safety condition in a user interface of a device associated with the user.

20 Claims, 11 Drawing Sheets

(56) References Cited

U.S. PATENT DOCUMENTS

| | | | |
|---|---|---|---|
| 2003/0227395 A1* | 12/2003 | Zeineh | G08G 1/207 340/988 |
| 2005/0027727 A1* | 2/2005 | Garcea | G06F 11/3495 |
| 2007/0028219 A1* | 2/2007 | Miller | G06F 11/3409 717/124 |
| 2007/0150142 A1* | 6/2007 | Cieler | G01C 21/3605 701/33.4 |
| 2008/0122605 A1* | 5/2008 | Tengler | G08G 1/164 340/467 |
| 2010/0052948 A1* | 3/2010 | Vian | G08G 1/01 340/963 |
| 2010/0057511 A1* | 3/2010 | Mansouri | G07C 5/008 705/7.13 |
| 2014/0167946 A1* | 6/2014 | Armitage | G09B 19/167 340/439 |
| 2016/0300378 A1* | 10/2016 | Thomas | G07C 5/06 |
| 2016/0320195 A1* | 11/2016 | Liu | G06Q 50/01 |
| 2017/0287322 A1* | 10/2017 | Drake | G07C 5/008 |
| 2018/0025430 A1 | 1/2018 | Perl et al. | |
| 2018/0304906 A1* | 10/2018 | Powell | B60R 16/037 |
| 2018/0326947 A1* | 11/2018 | Oesterling | G07C 9/00571 |
| 2019/0156266 A1* | 5/2019 | Hubbard | G06Q 10/06398 |
| 2019/0188927 A1* | 6/2019 | Kageyama | B60W 30/188 |
| 2019/0212754 A1* | 7/2019 | Smith | G05D 1/0088 |
| 2019/0311404 A1* | 10/2019 | Wasserman | G06F 3/147 |
| 2019/0340849 A1* | 11/2019 | Uchida | G07C 5/008 |
| 2020/0166929 A1* | 5/2020 | Jiwani | G06K 9/00845 |
| 2020/0189500 A1* | 6/2020 | Recktenwald | B60R 16/037 |
| 2020/0189609 A1* | 6/2020 | Lee | B60W 50/045 |
| 2020/0231168 A1* | 7/2020 | Uthaicharoenpong | H04W 4/40 |
| 2020/0233940 A1* | 7/2020 | Edwards | G06F 21/32 |

\* cited by examiner

METHOD, APPARATUS, AND SYSTEM FOR ASSESSING SAFETY AND COMFORT SYSTEMS OF A VEHICLE

BACKGROUND

Consumer confidence in the safety and comfort of modern vehicles is a growing concern particularly as vehicles become more autonomous and complex. For example, modern vehicles (e.g., autonomous, semi-autonomous, or highly assisted vehicles) are equipped with a growing array of intricate sensors, systems, and other equipment that are often beyond the technical capabilities of average consumers to assess, maintain, or repair. Moreover, modern vehicles such as autonomous vehicles may generate large amounts of data streams onboard as well as through other external data sources (e.g., external maintenance logs, regulatory safety records, accident records, vehicle operator records, etc.). While these vehicles may have onboard vehicle self-assessment systems, they historically do not access external data sources to provide a more complete assessment of the over safety and comfort condition of the vehicle. Consumer confidence in such self-assessments can also be lower because users may not have complete trust the their output based of fears of potential systematic errors or biases in self-assessment systems. Accordingly, service providers face significant technical challenges to assessing the safety and comfort systems and subsystems of a vehicle based on both onboard and external sources of vehicle performance, maintenance, safety, comfort, etc. data.

SOME EXAMPLE EMBODIMENTS

Therefore, there is a need for an approach for assessing the condition of vehicle safety and comfort systems independently of onboard vehicle systems. In one embodiment, the independent assessment can provided to a user (e.g., a passenger, an operator, etc.) before boarding the assessed vehicle.

According to one embodiment, a computer-implemented method for assessing safety and comfort systems of a vehicle comprises aggregating operational data associated with the vehicle from a plurality of data sources. The method also comprises processing the operational data against operational criteria to determine a normal operational status or an abnormal operational status of the vehicle. The method further comprises generating an independent assessment of a safety condition of the vehicle based on the normal operational status or the abnormal operational status. The independent assessment is performed independently of an assessment system of the vehicle, a manufacturer of the vehicle, or a combination thereof. The method further comprises providing data indicating the safety condition in a user interface of a device associated with the user in response to a request by a user to use the vehicle.

According to another embodiment, an apparatus for assessing safety and comfort systems of a vehicle comprises at least one processor, and at least one memory including computer program code for one or more computer programs, the at least one memory and the computer program code configured to, with the at least one processor, cause, at least in part, the apparatus to aggregate operational data associated with the vehicle from a plurality of data sources. The apparatus is also caused to process the operational data against operational criteria to determine a normal operational status or an abnormal operational status of the vehicle. The apparatus is further caused to generate an independent assessment of a safety condition of the vehicle based on the normal operational status or the abnormal operational status. The independent assessment is performed independently of an assessment system of the vehicle, a manufacturer of the vehicle, or a combination thereof. The apparatus is further caused to provide data indicating the safety condition in a user interface of a device associated with the user in response to a request by a user to use the vehicle.

According to another embodiment, a non-transitory computer-readable storage medium for assessing safety and comfort systems of a vehicle carries one or more sequences of one or more instructions which, when executed by one or more processors, cause, at least in part, an apparatus to aggregate operational data associated with the vehicle from a plurality of data sources. The apparatus is also caused to process the operational data against operational criteria to determine a normal operational status or an abnormal operational status of the vehicle. The apparatus is further caused to generate an independent assessment of a safety condition of the vehicle based on the normal operational status or the abnormal operational status. The independent assessment is performed independently of an assessment system of the vehicle, a manufacturer of the vehicle, or a combination thereof. The apparatus is further caused to provide data indicating the safety condition in a user interface of a device associated with the user in response to a request by a user to use the vehicle.

According to another embodiment, an apparatus for assessing safety and comfort systems of a vehicle comprises means for aggregating operational data associated with the vehicle from a plurality of data sources. The apparatus also comprises means for processing the operational data against operational criteria to determine a normal operational status or an abnormal operational status of the vehicle. The apparatus further comprises means for generating an independent assessment of a safety condition of the vehicle based on the normal operational status or the abnormal operational status. The independent assessment is performed independently of an assessment system of the vehicle, a manufacturer of the vehicle, or a combination thereof. The apparatus further comprises means for providing data indicating the safety condition in a user interface of a device associated with the user in response to a request by a user to use the vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for assessing safety and comfort systems of a vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
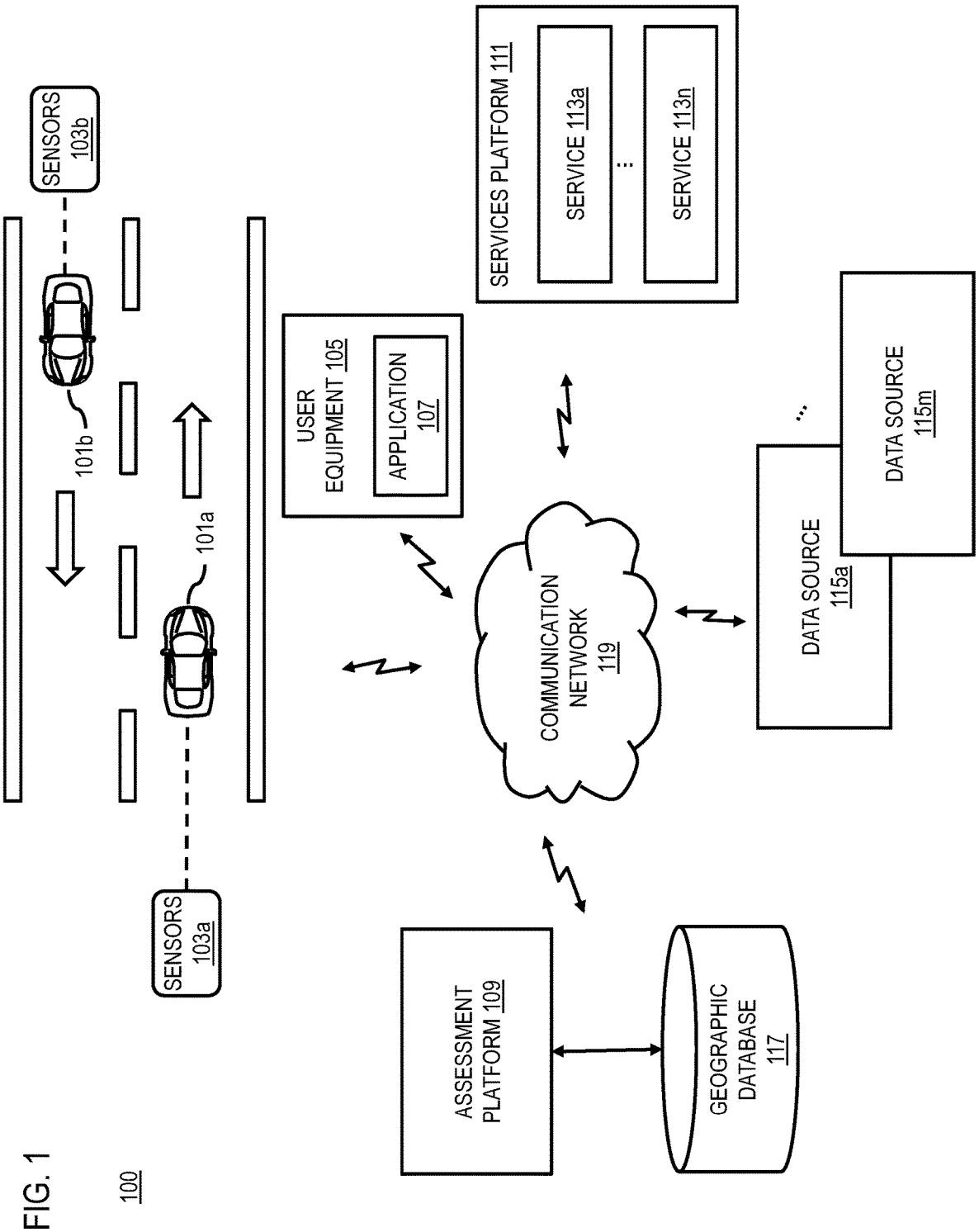
FIG. 1 is a diagram of a system capable of assessing safety and comfort systems of a vehicle, according to one embodiment.

FIG. 1 is a diagram of a system capable of assessing safety and comfort systems of a vehicle (e.g., an autonomous vehicle, a semi-autonomous vehicle, a driver-assisted vehicle, a ride sharing vehicle, a personal vehicle, etc.), according to one embodiment. Modern vehicles 101a and 101b (also collectively referred to as vehicles 101), in particular autonomous or semi-autonomous vehicles, are equipped with multiple sensor arrangements (e.g., sensors 103a and 103b, also collectively referred to as sensors 103) that monitor the vehicle 101's environment, as well as the many operating parameters of the different vehicle subsystems and components (e.g., vehicle safety and comfort systems). Vehicles 101 can maintain operation logs, keep track of their own service appointments, detect dangerous/critical safety conditions and even record if an accident or other safety incident has occurred. As the vehicle 101 operates or travels on a road network, the vehicle subsystems, sensors 103, software, and/or other components of the vehicle 101 can become worn, damaged, broken, or malfunction due to, but not limited to, environmental conditions, no maintenance service, and so forth. As critical vehicle functions (e.g., safety functions, fuel or power efficiency functions, autonomous or semi-autonomous driving functions, etc.) become more dependent on these subsystems and components, assessing that the subsystems or components are in safe operating condition becomes more important.

For example, autonomous vehicles 101 currently are starting to operate on public roads, mostly on trial basis (e.g., at the time of this patent application filing). While a truly autonomous vehicle 101 (e.g., National Highway Traffic Safety Administration (NHTSA) autonomous level 4 or 5) is not yet available for consumers to purchase, trials have taken place where autonomous vehicles 101 provide a taxi-like service to members of the public. Only a few providers have offered the option until now, and these have done so with an accompanying highly trained technician or engineer on board. As such services mature, the need for a trained occupant may disappear, making autonomous taxi services economically viable. At that time, users will not be expected to understand the technology of the autonomous vehicle 101 they are boarding and thus may not be comfortable with assessing the safety and comfort condition of the vehicle 101 before they board or use the vehicle 101. For example, in case one of the vehicle 101's safety or comfort subsystems malfunctions (e.g., brake failure, battery discharges, tire puncture, infotainment system failure, air conditioning failure, etc.) during a journey, then the user experience and confidence in autonomous vehicles 101 may not be good.

Consumer trust and confidence can vital for the success of autonomous vehicles 101, particularly as a public transport option. As time progresses, autonomous vehicle technology will be inherently trusted to perform in a safe manner. Still even then, maintenance of such vehicles 101 is important keep the level of safety that customers expect. In addition, offering automated public transport opens many liability issues for manufacturers and operators, which, in case of a claim, will question if the vehicles 101 have been properly maintained or are free from safety system abnormalities.

Therefore, assessing and conveying to end users that the vehicle 101 and/or its safety and comfort subsystems (e.g., sensors 103) are working in a safe or normal operating condition, presents significant technical challenges. Even if the vehicle 101 and/or its subsystems are working in safe operating condition, assessing the continued maintenance of the safe condition of the vehicle 101 and/or its subsystems also presents significant technical challenges. In addition, while regulations may be in place, which prohibit a service provider (e.g., a taxi service) from offering rides to a user on a vehicle 101, e.g., that may have missed a required inspection, there is no assurance for the user that the vehicle 101 she or he is about to board has been inspected and serviced properly.

To address these challenges, a system 100 of FIG. 1 introduces a capability to independently assess the safety and comfort systems of the vehicle 101 (e.g., vehicles 101a, or 101b, also collectively referred to as a vehicle 101) to provide users with information (e.g., the independent assessment or a recommendation based on the independent assessment) that will ultimately assist the user in deciding to board or not board the vehicle 101. In one embodiment, the system 100 makes the independent assessment (e.g., wherein the assessment is performed external to any system onboard the vehicle 101 and/or operated by a manufacturer of the vehicle 101) by collecting vehicle data from multiple data sources (e.g., internal and external to the vehicle 101).

For example, autonomous vehicles 101 constantly monitor multiple operational parameters of subsystems, components, and running software. These monitoring applications detect when an operational parameter falls outside of the normal operation range, or when a combination of parameters indicate that a vehicle is operating in an abnormal fashion. These abnormal operation events can be logged. In addition, alerts and warnings can be identified through the use of vehicle sensors 103 monitoring the vehicle 101's environment. The events can be collected and identified according to the time and location of where such events have taken place.

In one embodiment, functionality of comfort features or systems aboard the vehicle 101 (e.g. HVAC, infotainment unit, connectivity services, amenities, vending machines, etc.) can be monitored for the vehicle 101, and records of availability for such features can be maintained. Data records for vehicle aesthetics (e.g. dents and scratches) can also be maintained. In another embodiment, maintenance service events (e.g. repairs, inspections, cleaning) can also be recorded and logged by the vehicle 101 or by the entity performing the service. A vehicle 101's legal status (stolen, reported at a crime scene, involved in an accident, etc.) can also queried (e.g., from police records, insurance records, etc.) and included as part of the vehicle 101's plurality of data sources. The example data sources and record described above are provided by way of illustration and not as limitations. It is contemplated that any other vehicle data or record available to the system 100 can be used to assess the safety or comfort condition of the vehicle 101.

It becomes apparent that a huge amount of information related to an autonomous vehicle 101's safety and comfort will be available. It is also clear that such a variety of parameters cannot be quickly assessed even by a well-trained individual, let alone by a user who is about to board a vehicle 101. Accordingly, in one embodiment, the system 100 collects different types of information from the different entities or data sources, produce an assessment of the vehicle 101's condition, and provide the user with an independent certification of the vehicle 101's safety. In one embodiment, the different parameters produced by the different sources or parties (e.g., vehicle sensors, operator, maintenance garage, insurance company, etc.) and/or the resulting assessment can be recorded in a blockchain transaction associated with the vehicle 101 to further increase confidence in the authenticity of the assessment. As blockchain transactions, these records would be immutable and provide a basis for the assessment platform 109 to operate on data obtained from the blockchain. In one embodiment, the use of blockchain chain allows for the assessment platform 109 to run as a local application on, for instance, the UE 105 or equivalent device.

In one embodiment, the system 100 system could surface the vehicle 101's comfort system parameters, which should also assist the user in deciding to board the vehicle 101. For example, on a hot day, a user may choose not to board an autonomous vehicle 101 with a defective air conditioning system. Alternatively, the system 100 can determine user preferences with respect to comfort features to determine whether or not the defective feature is critical or not critical to the user. If it is critical then the system 100 can recommend that the user not board, or if it is not critical then the system 100 can recommend that the user boards. For example, if it is a relatively cool day and the user prefers no air conditioning, the system 100 can recommend that the user 101 board even with a defective air conditioning system.

Although the various embodiments described herein are discussed with respect to an autonomous vehicle 101, it is contemplated that the embodiments are also applicable to semi-autonomous or non-autonomous vehicles. In addition, it is contemplated that the vehicle 101 can be an automobile or any other type vehicle (e.g., truck, plane, boat, train, etc.).

In summary, in one embodiment, the system 100 collects operational data associated with the vehicle 101 to generate an assessment of safety conditions of the vehicle 101 to determine whether the components and/or sub-components, or software of the vehicle 101 are functionally working properly or not, in one embodiment. In one embodiment, the assessment of the vehicle is performed independently of an assessment system of the vehicle, a manufacturer of the vehicle, or a combination thereof.

In other words, in one embodiment, the system 100 determines an operational status (e.g., normal operational status or abnormal operational status) of each of the components, subsystems, and/or running software of the vehicle 101 based on their operational data and is presented to a user on a user equipment 105 (e.g., a smartphone), so that the user (e.g., rider, operator, taxi service provider, etc.) may decide whether to board the vehicle 101 or not. In one embodiment, the system 100 aggregates operational data associated with the vehicle 101 from a number of data sources. The operational data associated with the vehicle 101 may include, but is not restricted to, operational parameters that may assist the system 100 to detect whether the subsystems, components and/or running software of the vehicle 101 are working normally or not. The system 100 further processes the operational data to determine operational status (e.g., normal operational status or abnormal operational status) of the vehicle 101. An assessment of a safety condition of the vehicle is then generated based on the determined operational status of the vehicle 101. Further, in case a query from a user for using the vehicle 101 is received by using an application 107 (e.g., application available to an end user or consumer) of the user equipment 105 of the user, then the generated assessment of the vehicle 101 and/or a recommendation based on the assessment (e.g., recommendation to board or not board) is provided to the user. Based on the assessment and/or recommendation, the user may decide whether to board the vehicle or not. In this way, the system 100 determines the operational and safety conditions associated with the vehicle 101, which further results in increased confidence that the user will have a safe and comfortable journey.

The embodiments of the system 100 provide several advantages over conventional approaches. For example, most of the records or operational data associated with the maintenance of the vehicle are kept by the garage or service centers, or manufacturers of the vehicle and may not be easily accessible by the user. For example, the service centers of manufacturers may share limited data such as, an alert for a next service window, but this information is not provided to the user as an assessment of a vehicle's safety or comfort condition. In contrast, the embodiments described herein provide a certification of the vehicle 101 to the user, which indicates that the operational status of the vehicle 101 is normal or not based on data available from a multiple sources (e.g., including maintenance records from service centers, etc.) before riding the vehicle and to further decide whether the user should board the vehicle 101 or not. Therefore, the embodiments of the present invention provides a transparency to the user about the operational and safety operations of the vehicle before boarding.

Figure 2:
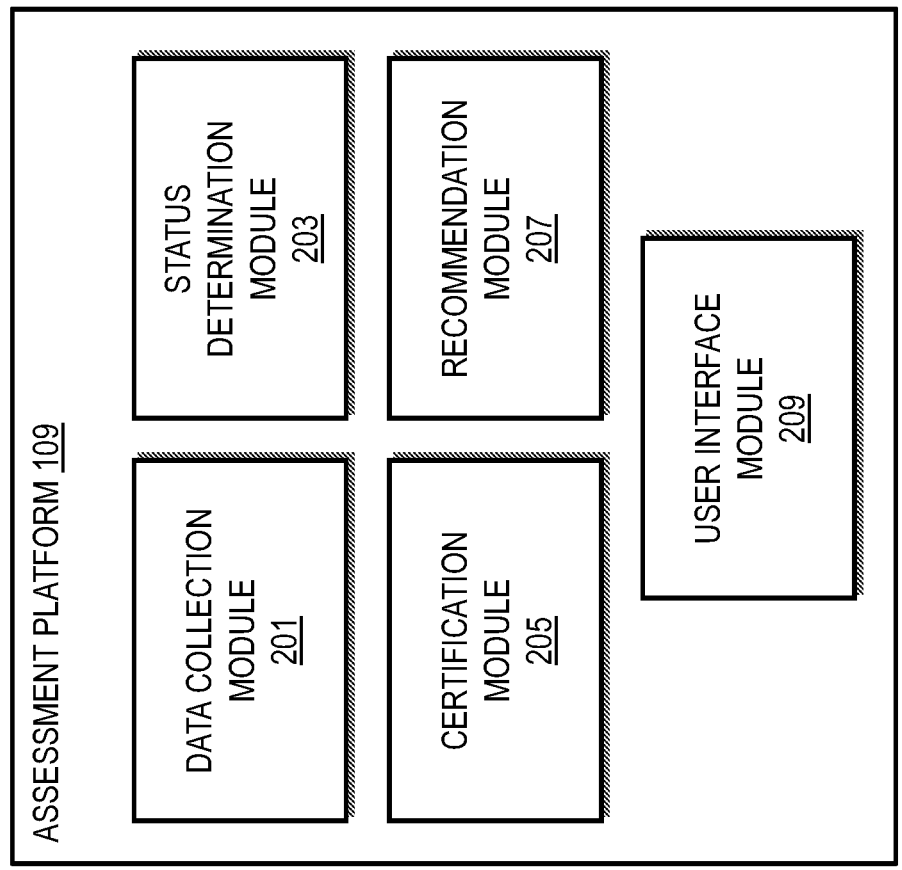
FIG. 2 is a diagram of components of an assessment platform capable of assessing safety and comfort systems of a vehicle, according to one embodiment

In one embodiment, as shown in FIG. 2, an assessment platform 109 includes one or more components for assessing safety conditions of the vehicle 101, according to the various embodiments described herein. It is contemplated that the functions of these components may be combined or performed by other components of equivalent functionality. In this embodiment, the assessment platform 109 includes a data collection module 201, a status determination module 203, a certification module 205, a recommendation module 207, and a user interface module 209. In addition, the assessment platform 109, the vehicle 101, and/or an application 107 executing on the user equipment 105 can include algorithms for processing the operational data of the vehicle 101 alone or in combination with the other modules described herein. The above presented modules and components of the assessment platform 109 can be implemented in hardware, firmware, software, or a combination thereof. Though depicted as a separate entity in FIG. 1, it is contemplated that the assessment platform 109 may be implemented as a module of any other component of the system 100 (e.g., a component of the services platform 111, services 113a-113n (also collectively referred to as services 113), the user equipment 105, an application 107 executing on the user equipment 105, etc.). In another embodiment, one or more of the modules 201-209 may be implemented as a cloud based service, local service, native application, or combination thereof. The functions of the assessment platform 109 and the modules 201-209 are discussed with respect to FIGS. 3-4 below.

Figure 3:
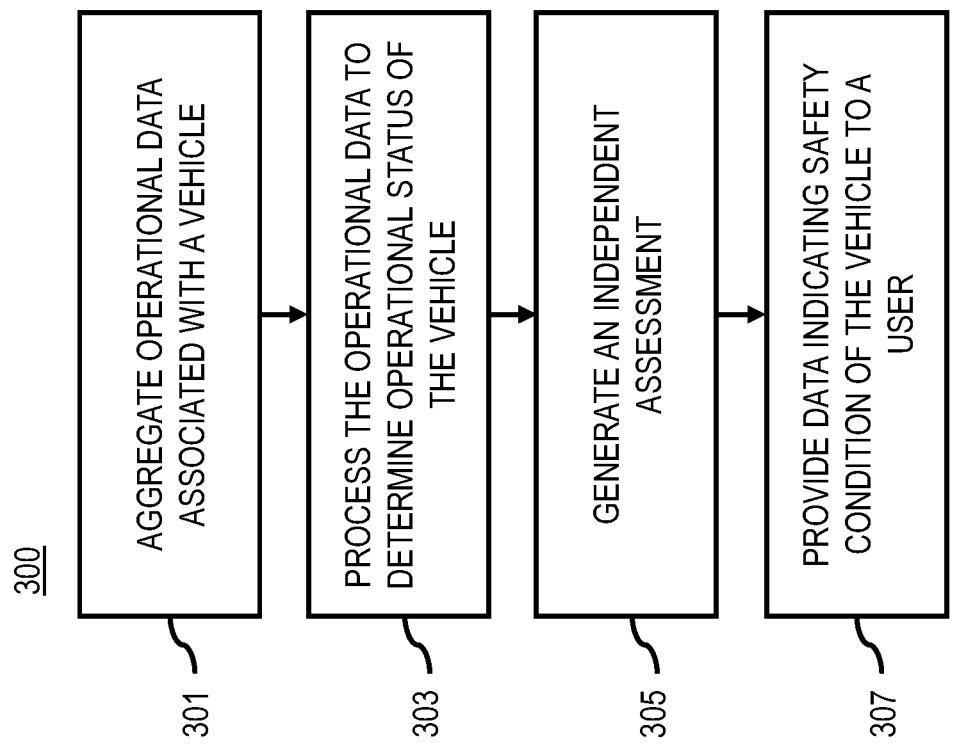
FIG. 3 is a flowchart of a process for assessing safety and comfort systems of a vehicle, according to one embodiment.
Figure 4:
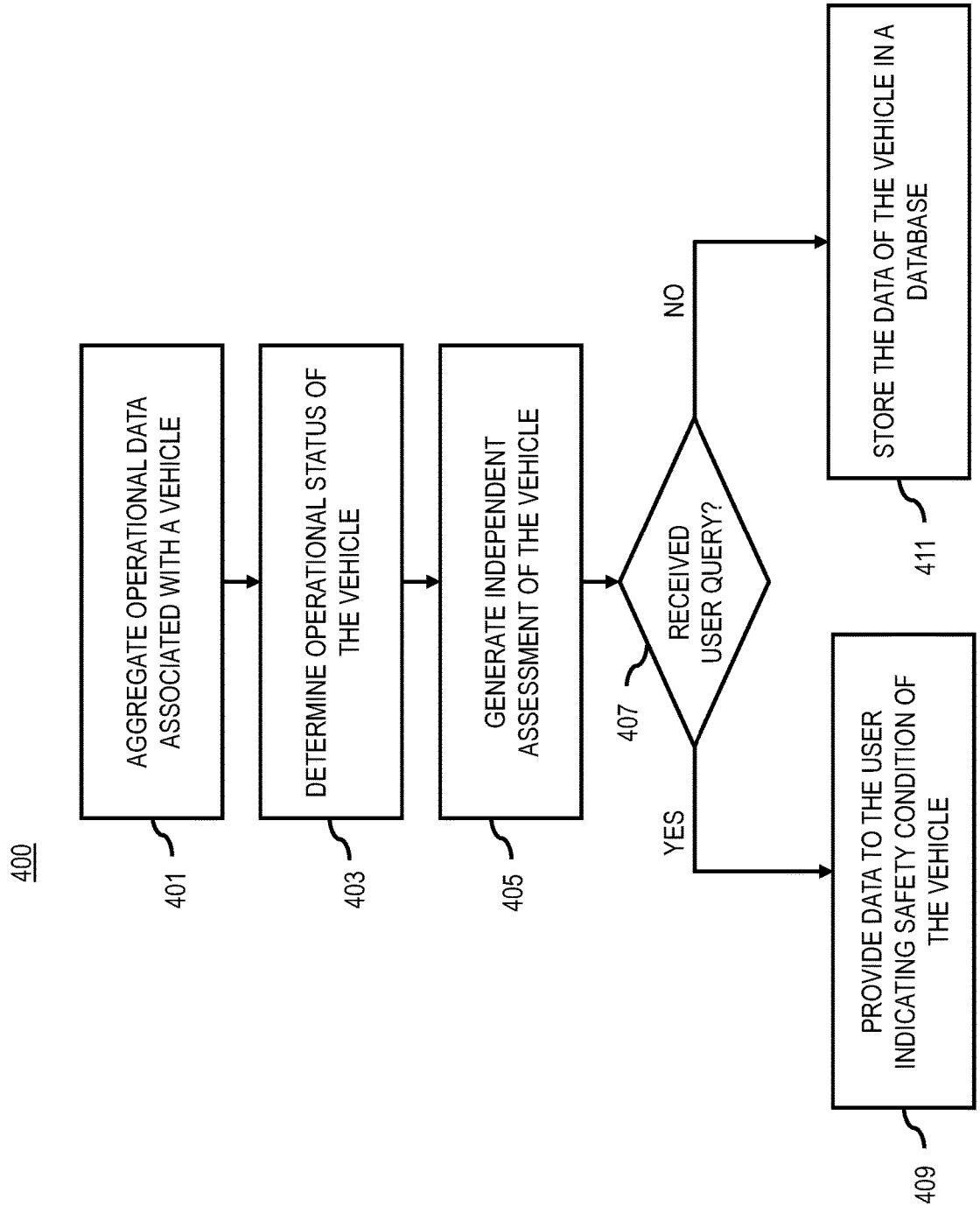
FIG. 4 is a flowchart of a process for assessing safety and comfort systems of a vehicle, according to another embodiment.
Figure 9:
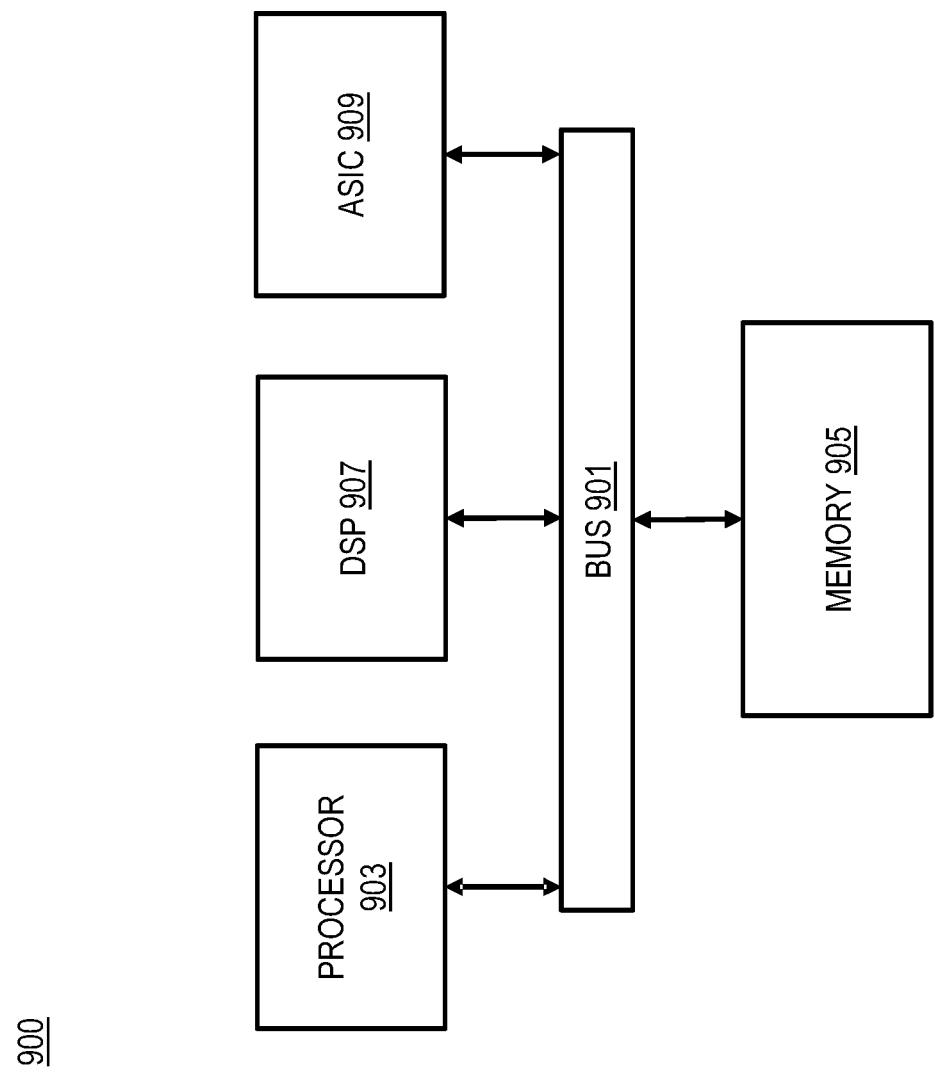
FIG. 9 is a diagram of a chip set that can be used to implement an embodiment.

FIGS. 3-4 are flowcharts of processes 300, and 400 for assessing operational and safety conditions of a vehicle, according to one embodiment. More specifically, the embodiments of the processes 300, and 400 can be used to generate a certification for a vehicle 101 that indicates operational and safety conditions of the vehicle 101. In various embodiments, the assessment platform 109 and/or any of the modules 201-209 of the assessment platform 109, may perform one or more portions of any of the processes 300, and 400 and may be implemented in, for instance, a chip set including a processor and a memory as shown in FIG. 9. As such, the assessment platform 109, any of the modules 201-209, can provide means for accomplishing various parts of the processes 300, and 400, as well as means for accomplishing embodiments of other processes described herein in conjunction with other components of the system 100. Although the processes 300, 400 are illustrated and described as a sequence of steps, its contemplated that various embodiments of the processes 300, and 400 may be performed in any order or combination and need not include all of the illustrated steps.

As discussed above, in one embodiment, the assessment platform 109 accomplishes the processes 300, 400 of assessing operational and safety conditions of a vehicle 101.

In one embodiment, the operation of the process 300 can be summarized as follows:

Aggregate operational data associated with a vehicle (step 301);

Process the operational data (step 303);

Generate an independent assessment from the processed operational data (step 305); and Provide the assessment data to a user (step 307).

Embodiments of the processes 300 and 400 are described below.

Figure 5:
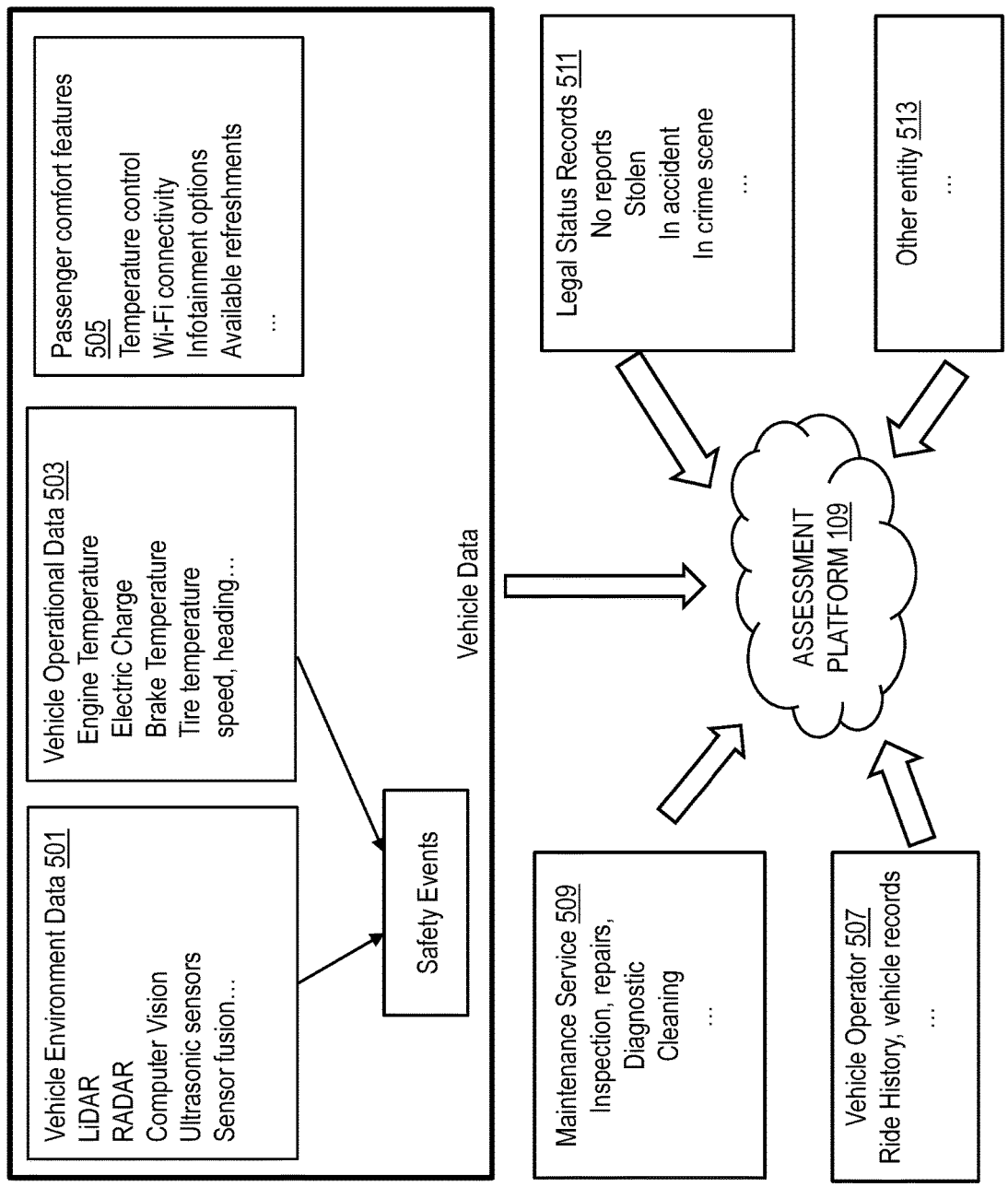
FIG. 5 is a diagram illustrating an example of a system for generating operational data related to a vehicle, according to one embodiment.

In step 301, the data collection module 201 collects operational data associated with a vehicle (e.g., the vehicle 101) from one or more data sources. As described above, the operational data may comprise data about the condition of the subsystems, components, and/or running software associated with the vehicle 101. In one embodiment, the operational data may comprise operational parameters such as, but is not limited to, comfort features, vehicle aesthetics, legal status, service events, an operator, and so forth. As shown in FIG. 5, the data sources 115 from which operational data may be collected, are either external to the vehicle 101 or internal to the vehicle 101. Some of the internal data source 115 may be the sensors 103 of the vehicle 101. In one embodiment, the sensors 103 of the vehicle 101 may be used to collect vehicle environmental data 501, for example, but is not limited to, LIDAR, RADAR, computer vision, ultrasonic data, sensor fusion data, and so forth.

In another embodiment, the sensors 103 may be used to collect vehicle operational data 503, for example, but is not limited to, an engine temperature, an electric charge, a brake temperature, a tire temperature, a tire pressure, a speed, a heading, and so forth. In yet another embodiment, the sensors 103 may be used to collect passenger comfort features 505 such as, but is not limited to, heating, ventilation, and air conditioning systems (HVAC), temperature control, Wi-fi connectivity or communication services, infotainment options, vending machines for refreshments, and so forth. The operational data collected by the sensors 103 of the vehicle 101 may then store the operational data in a database (e.g., a geographical database 117) by transmitting the operational data over a communication network 119. Although this embodiment is described with respect to the database 117 to store the operational data, it is contemplated that any other database may be used to store the operational parameters for assessing the safety conditions of the vehicle.

In another embodiment, some of the external data source 115 from which the operational data may be collected are, but is not limited to, an operator 507 of a vehicle, a maintenance service center 509, insurance companies 511, or other entities 513. The operator 507 of the vehicle 101 may provide data such as, a ride history, vehicle records, and so forth. Further, the maintenance service center 509 may provide service events such as events related to repairs, inspections, cleaning, and so forth, or vehicle aesthetics such as dents, or scratches. Furthermore, the insurance companies 511 may provide the legal status of the vehicle 101, for example, if the vehicle was stolen, involved in an accident, reported in crime scenes, etc. The operational data may then be stored in the database 117.

In another embodiment, the data collection module 201 may collect and/or generate a user profile from a number of sources, such as, but is not limited to, social media platforms, data provided by the user while registering to the application 107 for availing the services 113 provided by the service platform 111 (e.g., taxi or car rental service providers, etc.). The user profile may include, but is not limited to, a name, address, a contact number, an email id, preferences associated with a vehicle, a customer id, and so forth. In one embodiment, the user profile may be stored in the database 117.

In step 303, the status determination module 203 processes the operational data collected by the data collection module 201. In one embodiment, the operational data or parameters may be processed against operational criteria to determine an operational status of the vehicle 101. The operational criteria may describe the acceptable performance range for each of the subsystems, components, or running software of the vehicle 101 to operate in a functional mode of operation. For example, the criteria may specify a minimum range at which a sensor can detect whether a headlight is providing enough light to a distance (e.g., 20 feet) that can be used to see a front view of the vehicle during a night ride in order to avoid any collision with an object (e.g., a road divider, a car, an animal, etc.). The operational data can then be compared against this operational criteria (e.g., 20 feet) to determine whether the headlight is performing in an acceptable range. In the example, if the headlight does not provide light to a distance of 20 feet from the vehicle, then it is determined that the headlight is not working properly. In case, the operational data may be in compliance with the operational criteria then the operational status of the vehicle is said to be in normal operational status. In case, the operational data may not be in compliance with the operational criteria then the operational status of the vehicle is said to be in abnormal operational status. The operating status of each component, subsystem, or software of the vehicle 101 may be determined.

Further, the status determination module 203 categorizes the operational parameters as critical operational parameters or non-critical operational parameters. The critical operational parameters may be defined as the operational parameters whose proper function is important for the operation of the vehicle 101. The non-critical operational parameters may be defined as the operational parameters that may not have any or negligible effect on the operation of the vehicle 101, in case they are malfunctioned, damaged, or broken. For example, an electric charge of an electric vehicle needs to be fully charged for travelling a long distance. Then the operational data of electric charge is a critical operational parameter for a vehicle. In another example, if the journey of the vehicle is in city roads, then there may not be a requirement for a high speed operation. Hence, a malfunction of an active aerodynamic components may not be significant and therefore, can be categorized as a non-critical operational parameter. In one embodiment, the operational parameters may be categorized based on, but is not limited to, a service area of the vehicle 101 (e.g., urban, rural), environmental parameters (e.g., day or night, season, weather, outside temperature, etc.), a planned route of the vehicle 101, a profile of the user, and so forth.

In step 305, the certification module 205 may filter the operational data corresponding to the abnormal operational status of the subsystems, components, and/or running software of the vehicle 101 in order to select a small subset of the operational data. Although this embodiment is described with respect to filter the operational data corresponding to the abnormal operational status to store the operational data, it is contemplated that any other feature (normal operational status) may be used to filter the operational data. In one embodiment, the certification module 205 may filter and select the operational data indicating an abnormal operational status of one or more comfort features. For example, an air conditioning system of a vehicle 101 is not working, however, the route of travel is either at night, in winter or through a non-polluted area where the rider can lower the windows. In another example, on a short distance route, refreshments in an on-board fridge is not available and the day is cool, then there will not be any need of the refreshments or the rider may not purchase these during the short rides. In another embodiment, the certification module 205 may filter the operational data indicating an abnormal operational status of one or more other features, for example, legal status, service events, vehicle aesthetics, etc.

Further, the certification module 205 generates an independent assessment of a safety condition of the vehicle 101. The independent assessment may be defined as a data indicating safety condition of a vehicle 101. In addition, the independent assessment may include a recommendation regarding whether the user should board the vehicle or not. In one embodiment, the certification module 205 may generate the independent assessment of the vehicle based on the selected subset of operational data (e.g., a normal operational status or abnormal operational status). For example, the certification module 205 may generate the assessment based on the abnormal operational status of the vehicle 101 determined by the status determination module 203. In one embodiment, the certification module 205 may generate the assessment of the vehicle 101 independently of an assessment system of the vehicle 101, manufacturer of the vehicle 101, or a combination thereof. The certification module 205 may generate the independent assessment in the form of a certificate that verifies the operational condition of the vehicle 101, in one embodiment.

Further, the recommendation module 207 may generate the recommendation indicating the independent assessment of the vehicle 101 generated by the certification module 205. In one embodiment, the recommendation regarding whether the user should board the vehicle is based on the safety conditions, a profile of the user, a querying of the user, categorizing the operational parameters, or a combination thereof. For example, on a cold winter day, if the air conditioning system of a vehicle is not working, then the recommendation module 207 may generate a recommendation that the user should board the vehicle 101. In another example, if a user profile indicates that the user does not require music while travelling, then a recommendation is generated to board the vehicle even if the music system of the vehicle 101 is defective. In yet another example, on a hot summer day, a user may choose not to board the vehicle whose air conditioning is not working. In that vein, a price incentive may be offered to a prospective passenger, which may help the passenger to overlook minor comfort laws of the vehicle. The incentive may be offered by an incentive module (not shown) based on a decision of the user. The incentive may be, but is not limited to, a financial incentive (e.g., monetary incentive), a credit such as, a gift certificate, or coupon, points or tokens. In an exemplary scenario, a user may be awarded a gift coupon if the long-range RADAR malfunctions in a vehicle, and the user still decides to ride the vehicle as the vehicle will be moving in peak hours with heavy traffic.

At step 307, the user interface module 209 may present the independent assessment indicating the safety condition of the vehicle to a user on the user equipment 105. In one embodiment, the user interface module 209 may present the independent assessment or the certificate on a user interface of a user equipment 105 when approaching the vehicle 101 at a boarding location. In another embodiment, the user interface module 209 may present the independent assessment to the user at the time of booking a ride. For example, when a user enters a boarding location, a booking module (not shown) may identify that more than one vehicle may provide the required ride to the user. Then, the assessment platform 109 assesses the independent assessment for each of the vehicles and provide certificates for each of the vehicles. The user may then make a choice about which vehicle to book. In one embodiment, a recommendation of a vehicle may also be presented to the user based on the profile of the user. In one embodiment, the recommendation may be provided as an alert, or a notification (e.g., a popup, flash, etc.) on the user interface of the user equipment 105.

Further, the user interface module 209 may receive a query from a user using the application 107 of the user equipment 105. The user may inquire about the safety conditions of the vehicle, for example, before riding a personal vehicle by using the application 107 from the user equipment 105. Based on the query received from the user, the user interface module 209 may present the data indicating the current safety condition of the vehicle such as the vehicle is not clean from inside. Also, a recommendation, based on a user profile such as, the user is heading home from a football practice, is provided that the user should board the vehicle 101. In one embodiment, the user interface module 209 may present the data to the user only when a query is received from the user. In another embodiment, the user interface module 209 may present the recommendation to the user only when a query is received from the user.

The user interface module 209 may operate in conjunction with the modules (e.g., the data collection module 201, the status determination module 203, the certification module 205, the recommendation module 207, or a combination thereof) to present or display data such as, the operational data, indicating safety conditions of a vehicle, recommendations, and so forth on the user interface of the user equipment 105.

FIG. 4 is a flowchart of a process 400 for assessing safety conditions of a vehicle, according to another embodiment. In step 401, the assessment platform 109 aggregates operational data associated with a vehicle. The vehicle 101 may be, but is not limited to, an autonomous vehicle, a semi-autonomous vehicle, a ride sharing vehicle, a personal vehicle, a user-driven vehicle, etc. In one embodiment, the assessment platform 109 collects the operational data comprising operational parameters, for example, comfort features, vehicle aesthetics, legal status, service events, an operator, and so forth associated with the vehicle 101 from a number of data sources 115. In another embodiment, the assessment platform 109 may collect a profile of a user using the service 113 such as, booking a taxi, driving a vehicle, etc. The data source 115 may be, but is not limited to, sensors, an operator of a vehicle, a maintenance service center, insurance companies, or other entities.

In step 403, the assessment platform 109 determines an operational status of the vehicle 101. In one embodiment, the operational status of the vehicle may be determined by processing the operational data. The operational status of the vehicle may be either a normal operational status or an abnormal operational status. In one embodiment, the operational status of the vehicle may be determined by processing the operational data against operational criteria. In case, the operational data may be in compliance with the operational criteria then operational status of the vehicle is said to be in a normal operational status. In case, the operational data may not be in compliance with the operational criteria then the operational status of the vehicle is said to be in an abnormal operational status.

In step 405, the assessment platform 109 generates an independent assessment of the vehicle. The independent assessment may be defined as a data indicating safety condition of a vehicle 101. In one embodiment, the assessment platform 109 may generate the independent assessment of the vehicle based on the operational status of the vehicle (e.g., normal or abnormal), critical or non-critical operational parameters, and so forth. In one embodiment, the independent assessment of the vehicle may include recommendation for the user whether the user should board the vehicle or not. In one embodiment, the recommendation regarding whether the user should board the vehicle or not is based on the safety conditions, a profile of the user, a querying of the user, categorizing the operational parameters, or a combination thereof.

At step 407, the assessment platform 109 determines whether a query has been received from the user or not. In case, a query is received from the user using the application 107 on the user equipment 105, then the process 400 proceeds towards step 409. Otherwise, the process 400 proceeds towards step 411.

At step 409, the assessment platform 109 provides data indicating safety conditions of the vehicle to the user. In one embodiment, the assessment platform 109 may present the data on a user interface of the application 107 and/or user equipment 105 associated with the user. Further, the assessment platform 109 presents a recommendation to the user based on the profile, operating status of the vehicle, or a combination thereof.

At step 411, the assessment platform 109 stores the data indicating safety conditions of the vehicle in a database (e.g., database 117). In one embodiment, the assessment platform 109 may transmit the data over the communication network 119 to the database 117. In another embodiment, the assessment platform 109 may transmit the data over the communication network 119 to a server (not shown) of the system 100.

Figure 6A:
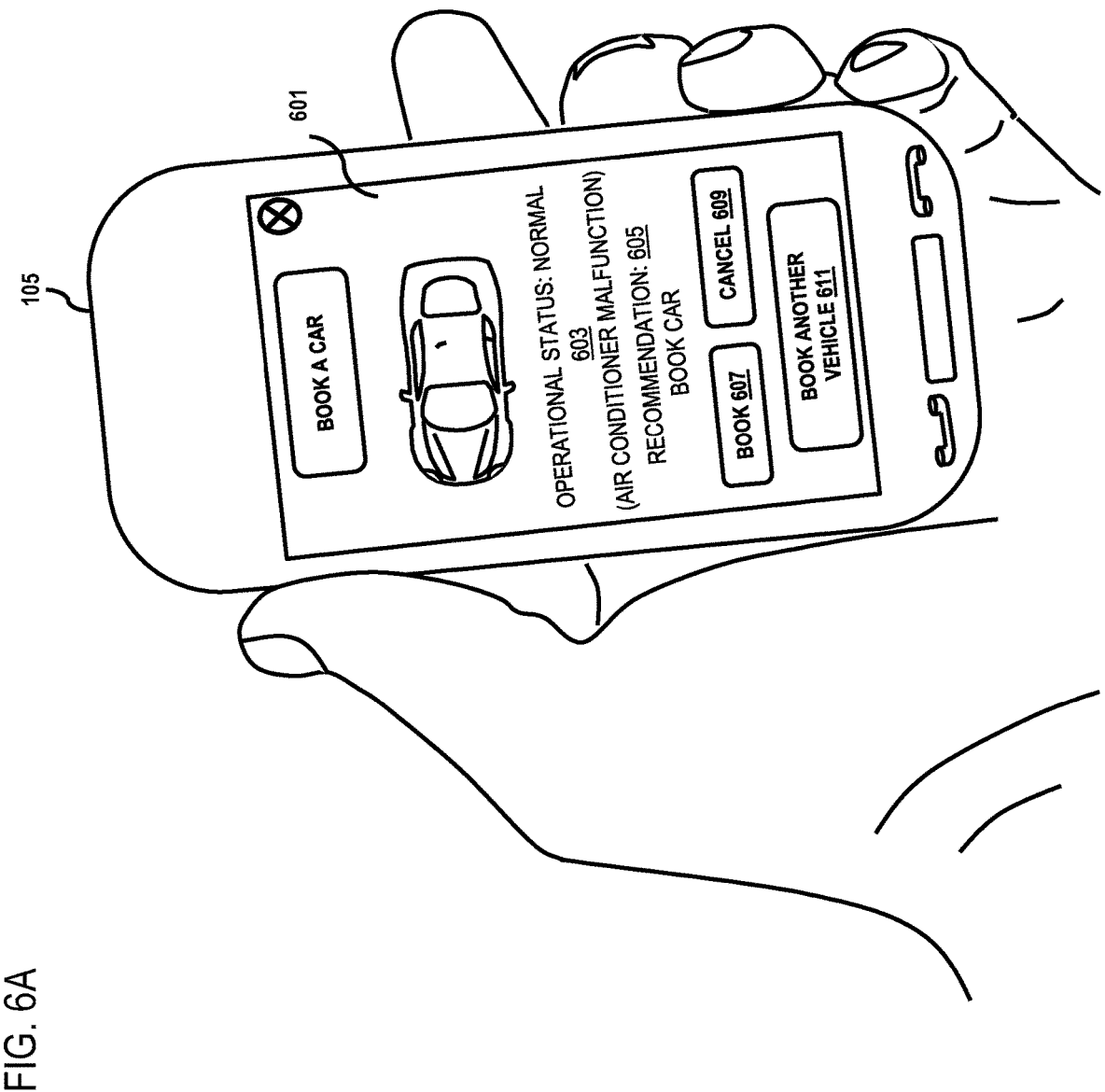
FIGS. 6A and 6B are diagrams of example user interfaces of a mobile device for presenting data indicating an assessment of vehicle safety and comfort systems to a user, according to one embodiment.

FIG. 6A is a diagram of an example user interface of a mobile device (e.g., user equipment 105) for presenting data indicating safety conditions to a user, according to one embodiment. A user may initiate a booking of a car by using the application 107 on the user equipment 105. As the user initiates to book a car by clicking on a 'book a car' button, a user interface 601 may display a car and its current operational status. When the user initiates the booking, safety conditions of the car are assessed based on the user query, a profile of the user, or a combination thereof. The system 100 assesses that the air conditioning system of the car is not working, but the temperature during the trip is expected to be cool, and therefore, the comfort feature parameter is categorized as a non-critical operational parameter. Based on the assessment, the operational status of the car is displayed as a normal operational status 603. In addition, a recommendation 605 is displayed on the user interface 601 that the user should book the car. In one embodiment, the user may book the car by clicking on a 'book' button 607, or may cancel the booking by clicking on a 'cancel' button 609. In case, the user cancels the booking of the car having malfunctioned air conditioning system, then the user can book another car by clicking on the 'book another vehicle' button 611.

Figure 6B:
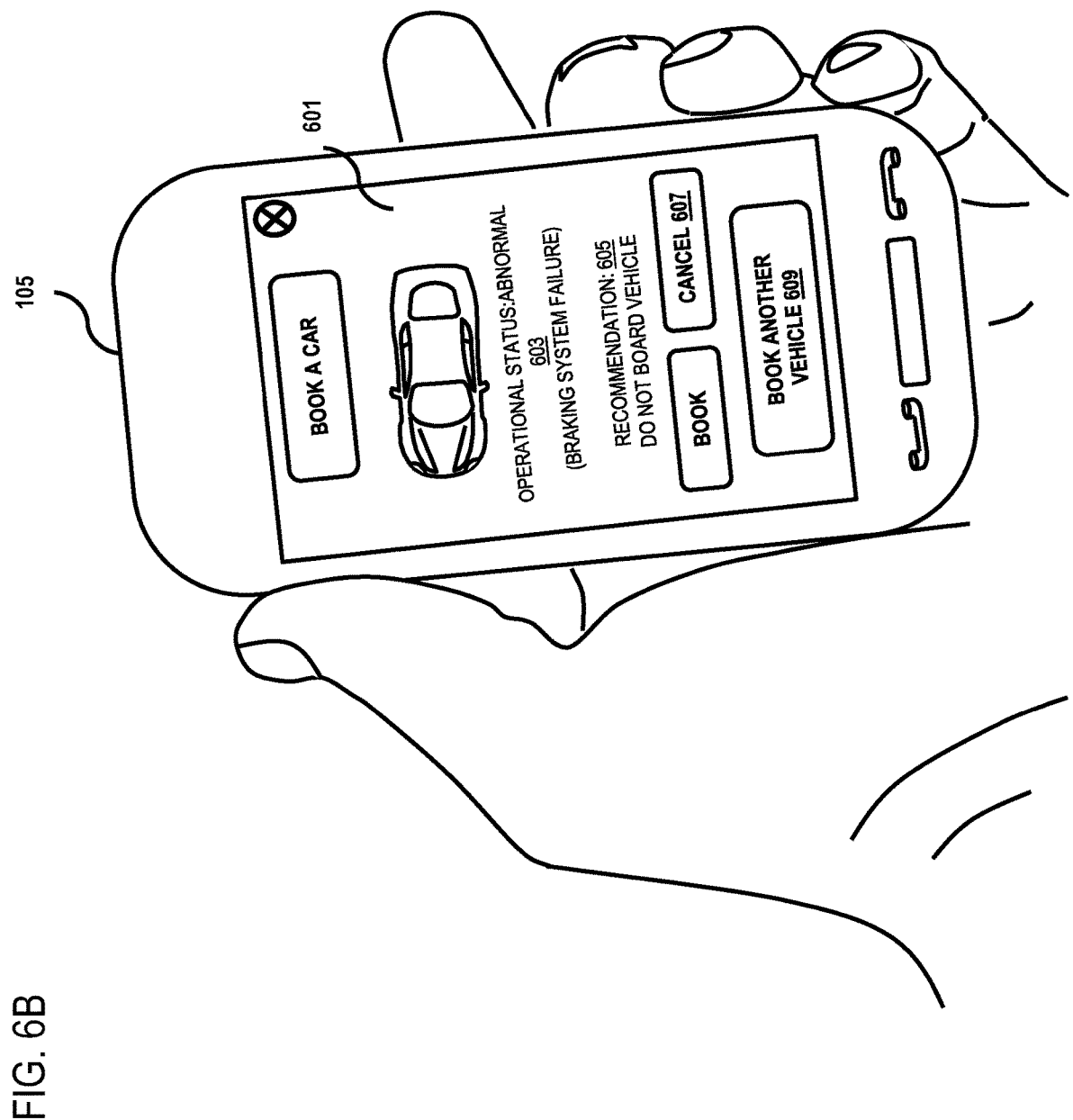

FIG. 6B is a diagram of an example user interface of a mobile device (e.g., user equipment 105) for presenting data indicating safety conditions to a user, according to another embodiment. A user may initiate a booking of a car by using the application 107 on the user equipment 105. As the user initiates to book a car by clicking on a 'book a car' button, a user interface 601 may display a car and its current operational status. When the user initiates the booking, safety conditions of the car are assessed by the system 100 based on the user query, a profile of the user, or a combination thereof. It is assessed that the braking system of the car is malfunctioned. The braking system is a critical parameter in the operation of the car and if the braking system is not working properly then it may result in an accident or cause a serious collision of the car. The operational status of the car is then displayed as an abnormal operational status 603. Also, a recommendation 605 is displayed on the user interface 601 that the user should not board the car. Further, the user cancels the booking of the car by clicking on a 'cancel' button 607 and books another car by clicking on the 'book another vehicle' button 609.

In one embodiment, in either of the cases illustrated in FIG. 6A or 6B, clicking on the 'book another vehicle' button triggers a request for alternate vehicles that can provide the transportation to the user, e.g., vehicles that could cover the user's desired route. Any such alternate vehicle would be assessed by the assessment platform 109. If multiple alternate vehicles are found, these can be ranked according to the results of the assessment.

Returning to FIG. 1, in one embodiment, the assessment platform 109 has connectivity over a communication network 119 to the service provider 111 (e.g., an OEM platform) that provides one or more services 113 (e.g., sensor data collection services). By way of example, the services 113 may also be other third-party services and include mapping services, navigation services, travel planning services, ride sharing services, notification services, social networking services, content (e.g., audio, video, images, etc.) provisioning services, application services, storage services, contextual information determination services, location-based services, information-based services (e.g., weather, news, etc.), etc. In one embodiment, the service provider 111 uses the output (e.g., safety condition predictions) of the assessment platform 109 to provide services such as booking a car, boarding a vehicle, other location-based services, etc.

In one embodiment, the assessment platform 109 may be a platform with multiple interconnected components. The assessment platform 109 may include multiple servers, intelligent networking devices, computing devices, components and corresponding software for providing assessment about a vehicle. In addition, it is noted that the assessment platform 109 may be a separate entity of the system 100, a part of the one or more services 113.

In one embodiment, data source 115a-115m (collectively referred to as data source 115) may provide content or data (e.g., operational data, environmental data, navigation data, etc.) to the geographic database 117, the assessment platform 109, the services platform 111, the services 113, and the vehicle 101. The content provided may be any type of content, such as textual content, audio content, video content, image content, etc. In one embodiment, the data source 115 may provide data that may aid in detecting and classifying operational parameters into critical and/or non-critical operational status. In one embodiment, the data source 115 may also store content associated with the assessment platform 109, services platform 111, services 113, and/or vehicle 101. In another embodiment, the data source 115 may manage access to a central repository of data, and offer a consistent, standard interface to data, such as a repository of the geographic database 117.

By way of example, the assessment platform 109 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the assessment platform 109 can support any type of interface to the user.

In one embodiment, the vehicle 101 is configured with various sensors for collecting operational data, vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for detecting physical dividers according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In one scenario, the sensors may detect weather data, traffic information, or a combination thereof. In one embodiment, the vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 119 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the assessment platform 109, services platform 111, services 113, vehicle 101, and/or data source 115 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
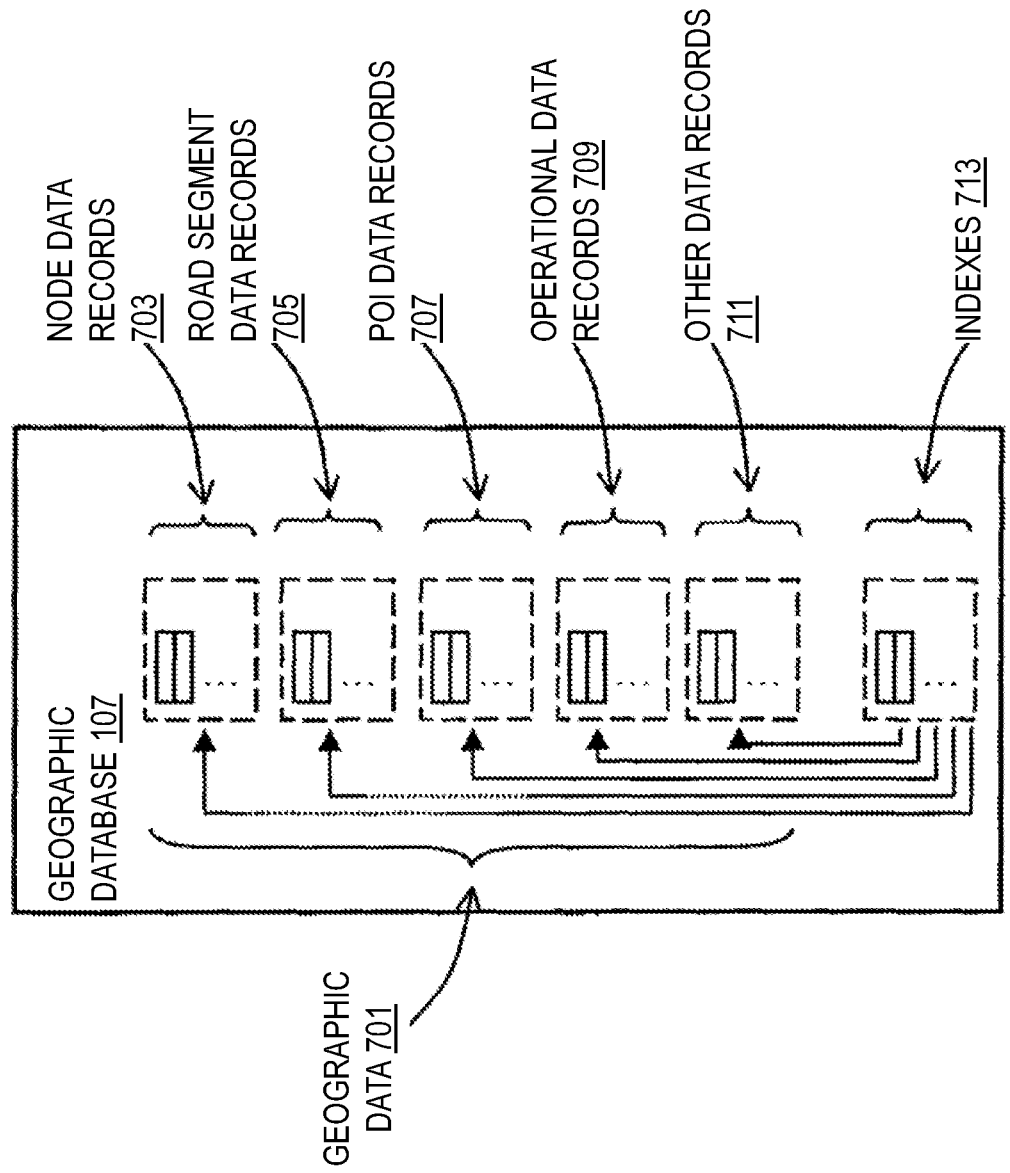
FIG. 7 is a diagram of a geographic database, according to one embodiment.

FIG. 7 is a diagram of a geographic database, according to one embodiment. In one embodiment, the geographic database 117 includes geographic data 701 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 117.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node. Also, there are no duplicated shape points, nodes, or links. Two links that connect each other have a common node. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 117 includes node data records 703, road segment or link data records 705, POI data records 707, operational data records 709, other records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 117. In one embodiment, the indexes 713 may be used to quickly locate data without having to search every row in the geographic database 117 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 707. The geographic database 117 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 117 can also include operational data records 709 for assessing operational and safety conditions of a vehicle. In one embodiment, the operational data records 709 can be associated with operational parameters such as, but is not limited to, comfort features, legal status, vehicle aesthetics, maintenance or service events, etc. associated with a vehicle. In one embodiment, the operational data records 709 may be collected from data source 115 such as, but is not limited to, sensors of the vehicle 101, an operator of a vehicle, a maintenance service center, insurance companies, or other entities.

In one embodiment, the operational data records 709 can be associated with one or more of the node records 703, road segment records 705, and/or POI data records 707; or portions thereof (e.g., smaller or different segments than indicated in the road segment records 705, individual lanes of the road segments, etc.) to provide situational awareness to drivers and provide for safer autonomous operation and routing of vehicles.

In one embodiment, the geographic database 117 can be maintained by the data source 115 or content providers (not shown) in association with the services platform 111 (e.g., vehicle rental shops, taxi service providers, etc.). In one embodiment, the service provider 111 may be a map developer to collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the geographic database 117 include high resolution or high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 117 is stored as a hierarchical or multilevel tile-based projection or structure. More specifically, in one embodiment, the geographic database 117 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

The geographic database 117 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for assessing safety condition of a vehicle may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
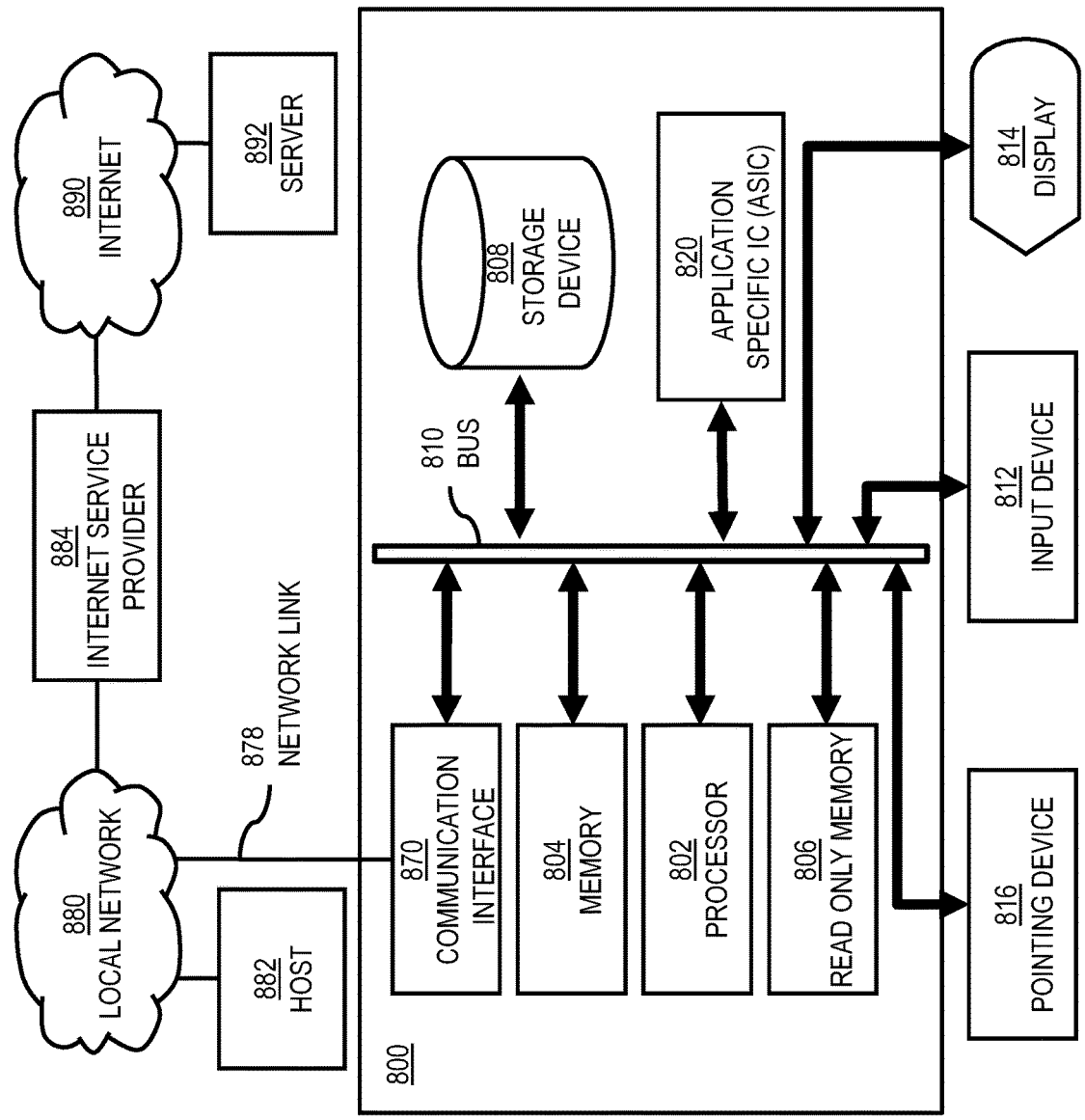
FIG. 8 is a diagram of hardware that can be used to implement an embodiment.

FIG. 8 illustrates a computer system 800 upon which an embodiment may be implemented. Computer system 800 is programmed (e.g., via computer program code or instructions) to assessing operational and safety conditions of a vehicle as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to assess operational and safety conditions of a vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for assessing operational and safety conditions of a vehicle. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for assessing operational and safety conditions of a vehicle, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 119 for assessing operational and safety conditions of a vehicle.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment may be implemented. Chip set 900 is programmed to assess operational and safety conditions of a vehicle as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to assess operational and safety conditions of a vehicle. The memory 905 also stores the data associated with or generated by the execution of the inventive steps.

Figure 10:
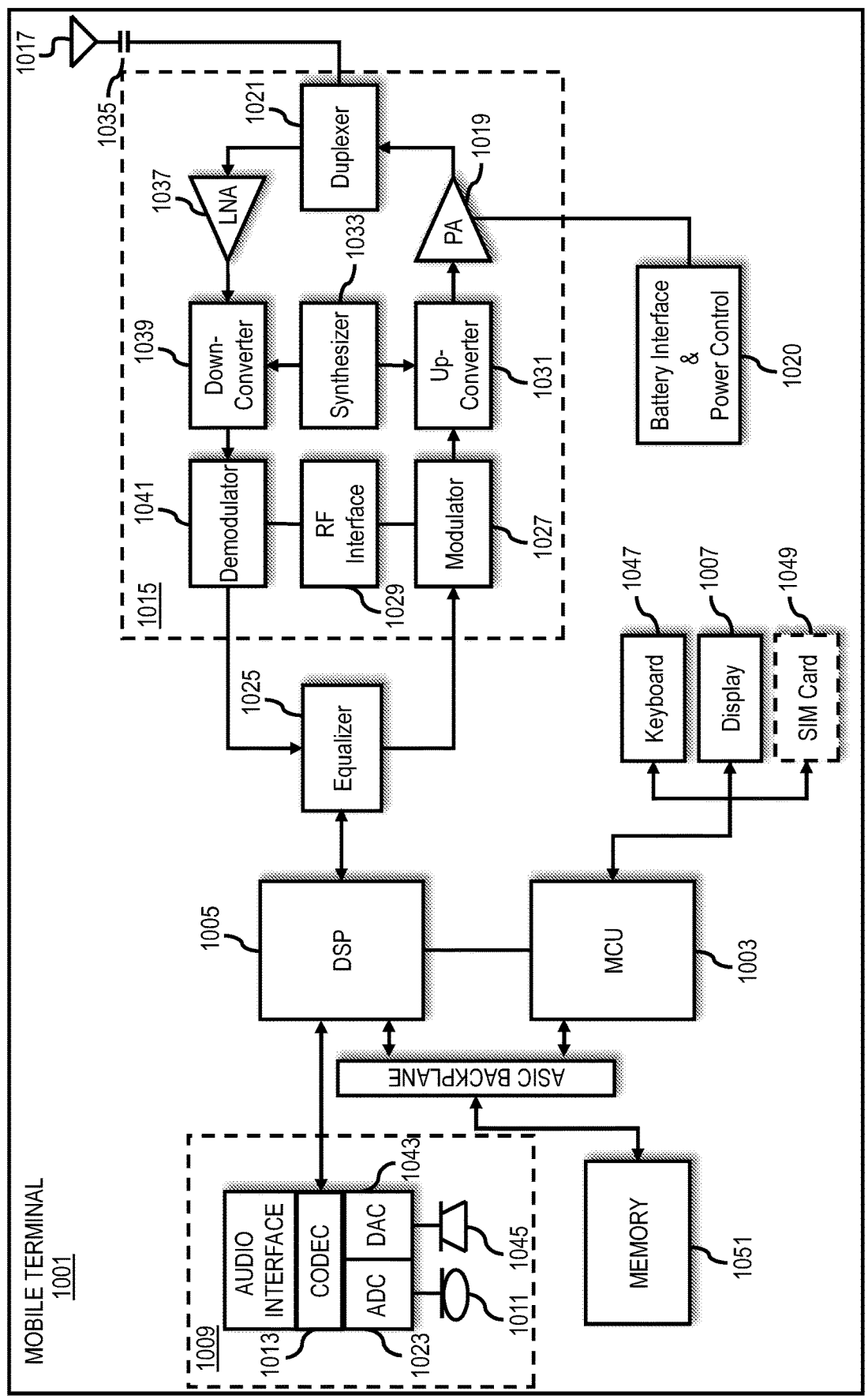
FIG. 10 is a diagram of a mobile terminal (e.g., handset or vehicle or part thereof) that can be used to implement an embodiment.

FIG. 10 is a diagram of exemplary components of a mobile terminal 1001 (e.g., handset, vehicle or part thereof, etc.) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to assess operational and safety conditions of a vehicle. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
aggregating operational data associated with a vehicle from a plurality of data sources;
processing the operational data against operational criteria to determine a normal operational status or an abnormal operational status of the vehicle;
generating an independent assessment of a safety condition of the vehicle based on the normal operational status or the abnormal operational status, wherein the independent assessment is performed independently of an assessment system of the vehicle, a manufacturer of the vehicle, or a combination thereof;
in response to a request by a user to use the vehicle, providing data indicating the safety condition in a user interface of a device associated with the user.

2. The method of claim 1, wherein the vehicle is an autonomous vehicle, a ride-sharing vehicle, a personal vehicle, or a combination thereof.

3. The method of claim 1, wherein the independent assessment further includes a recommendation regarding whether the user should board the vehicle based on the safety condition, a profile of the user, or a combination thereof.

4. The method of claim 3, wherein the operational data includes one or more operational parameters of the vehicle, the method further comprising:
categorizing the one or more operational parameters as a non-critical operational parameter or a critical operational parameter based on a service area of the vehicle, an environmental parameter, a planned route of the vehicle, the profile of the user, or a combination thereof,
wherein the recommendation regarding whether the user should board the vehicle is further based on the categorizing of the one or more operational parameters.

5. The method of claim 3, wherein the operational parameters relate to one or more comfort features, and wherein the one or more comfort features include a heating, ventilation, and air conditioning (HVAC) subsystem, an infotainment subsystem, a communications network subsystem, an availability of refreshments, or a combination thereof of the vehicle.

6. The method of claim 5, further comprising:
determining that the operational data indicates an abnormal operational status of the one or more comfort features,
wherein the recommendation regarding whether the user should board the vehicle in light of the abnormal operational status of the one or more features is determined based on the profile of the user, a querying of the user, or a combination thereof.

7. The method of claim 1, further comprising:
filtering the operational data to select a portion of the operational data corresponding to the abnormal operational status of the vehicle,
wherein the independent assessment is generated based on the selected portion of the operational data.

8. The method of claim 1, wherein the operational data relates to one or more maintenance service parameters of the vehicle.

9. The method of claim 1, wherein the vehicle has an operator, and wherein the operational data further relates to operator.

10. The method of claim 1, wherein the operational data further include one or more legal status records, and wherein the one or more legal records indicate a stolen status, an accident status, a crime status, or a combination thereof.

11. An apparatus comprising:
at least one processor; and
at least one memory including computer program code for one or more programs,
the at least one memory and the computer program code configured to, with the at least one processor, cause the apparatus to perform at least the following,
aggregate operational data associated with a vehicle from a plurality of data sources;
process the operational data against operational criteria to determine a normal operational status or an abnormal operational status of the vehicle;
generate an independent assessment of a safety condition of the vehicle based on the normal operational status or the abnormal operational status, wherein the independent assessment is performed independently of an assessment system of the vehicle, a manufacturer of the vehicle, or a combination thereof;
in response to a request by a user to use the vehicle, provide data indicating the safety condition in a user interface of a device associated with the user.

12. The apparatus of claim 11, wherein the vehicle is an autonomous vehicle, a ride-sharing vehicle, a personal vehicle, or a combination thereof.

13. The method of claim 11, wherein the independent assessment further includes a recommendation regarding whether the user should board the vehicle based on the safety condition, a profile of the user, or a combination thereof.

14. The method of claim 13, wherein the operational data includes one or more operational parameters of the vehicle, and wherein the apparatus is further caused to:
categorize the one or more operational parameters as a non-critical operational parameter or a critical operational parameter based on a service area of the vehicle, an environmental parameter, a planned route of the vehicle, the profile of the user, or a combination thereof,
wherein the recommendation regarding whether the user should board the vehicle is further based on the categorizing of the one or more operational parameters.

15. The apparatus of claim 11, wherein the operational parameters relate to one or more comfort features, and wherein the one or more comfort features include a heating, ventilation, and air conditioning (HVAC) subsystem, an infotainment subsystem, a communications network subsystem, an availability of refreshments, or a combination thereof of the vehicle.

16. A non-transitory computer-readable storage medium carrying one or more sequences of one or more instructions which, when executed by one or more processors, cause an apparatus to perform:
aggregating operational data associated with a vehicle from a plurality of data sources;
processing the operational data against operational criteria to determine a normal operational status or an abnormal operational status of the vehicle;
generating an independent assessment of a safety condition of the vehicle based on the normal operational status or the abnormal operational status, wherein the independent assessment is performed independently of an assessment system of the vehicle, a manufacturer of the vehicle, or a combination thereof;
in response to a request by a user to use the vehicle, providing data indicating the safety condition in a user interface of a device associated with the user.

17. The non-transitory computer-readable storage medium of claim 16, wherein the vehicle is an autonomous vehicle, a ride-sharing vehicle, a personal vehicle, or a combination thereof.

18. The non-transitory computer-readable storage medium of claim 17, wherein the independent assessment further includes a recommendation regarding whether the user should board the vehicle based on the safety condition, a profile of the user, or a combination thereof.

19. The non-transitory computer-readable storage medium of claim 18, wherein the operational data includes one or more operational parameters of the vehicle, and wherein the apparatus is caused to further perform:
categorizing the one or more operational parameters as a non-critical operational parameter or a critical operational parameter based on a service area of the vehicle, an environmental parameter, a planned route of the vehicle, the profile of the user, or a combination thereof,
wherein the recommendation regarding whether the user should board the vehicle is further based on the categorizing of the one or more operational parameters.

20. The method of claim 16, wherein the operational parameters relate to one or more comfort features, and wherein the one or more comfort features include a heating, ventilation, and air conditioning (HVAC) subsystem, an infotainment subsystem, a communications network subsystem, an availability of refreshments, or a combination thereof of the vehicle.

* * * * *